(12) United States Patent
Gadkaree et al.

(10) Patent No.: US 9,911,545 B2
(45) Date of Patent: *Mar. 6, 2018

(54) PHENOLIC RESIN SOURCED CARBON ANODE IN A LITHIUM ION CAPACITOR

(71) Applicant: CORNING INCORPORATED, Corning, NY (US)

(72) Inventors: Kishor Purushottam Gadkaree, Painted Post, NY (US); Rahul Suryakant Kadam, Corning, NY (US)

(73) Assignee: Corning Incorporated, Corning, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 14/610,848

(22) Filed: Jan. 30, 2015

(65) Prior Publication Data

US 2016/0225541 A1    Aug. 4, 2016

(51) Int. Cl.
| | |
|---|---|
| *H01G 11/38* | (2013.01) |
| *H01G 11/84* | (2013.01) |
| *H01G 11/06* | (2013.01) |
| *H01G 11/42* | (2013.01) |
| *H01G 11/44* | (2013.01) |

(Continued)

(52) U.S. Cl.
CPC ............ *H01G 11/38* (2013.01); *H01G 11/06* (2013.01); *H01G 11/42* (2013.01); *H01G 11/44* (2013.01); *H01G 11/50* (2013.01); *H01G 11/86* (2013.01); *H02J 7/007* (2013.01); *H01G 11/26* (2013.01); *H01G 11/34* (2013.01); *H02J 7/345* (2013.01); *Y02E 60/13* (2013.01)

(58) Field of Classification Search
CPC ........ H01G 11/26; H01G 11/30; H01G 11/32; H01G 11/42
USPC .......................................... 361/502
See application file for complete search history.

(56) References Cited

U.S. PATENT DOCUMENTS 7,283,349 B2   10/2007  Yoshida et al.
7,582,902 B2   9/2009   Tano et al.
(Continued)

FOREIGN PATENT DOCUMENTS

CN     10126539 A    9/2008
EP     0767505 A1    4/1997
(Continued)

OTHER PUBLICATIONS

Chang et al., The Influence of Different Electrode Fabrication Methods and Poly(Vinylidene Fluoride) Binders on the Anode Electrode Dimension Stability and Cyclability in Lithium-Ion Batteries, Journal of New Materials for Electrochemical Systems 11, 43-47 (2008).

(Continued)

*Primary Examiner* — Eric Thomas
(74) *Attorney, Agent, or Firm* — John L. Haack

(57) ABSTRACT

An anode in a lithium ion capacitor, including: a carbon composition comprising: a phenolic resin sourced carbon, a conductive carbon, and a binder as defined herein; and an electrically conductive substrate supporting the carbon composition, wherein the phenolic resin sourced carbon has a disorder by Raman analysis as defined herein; and a hydrogen content; a nitrogen content; an and oxygen content as defined herein. Also disclosed is a method of making the anode, a method of making the lithium ion capacitor, and methods of use thereof.

9 Claims, 3 Drawing Sheets

(51) Int. Cl.
*H01G 11/50* (2013.01)
*H01G 11/86* (2013.01)
*H02J 7/00* (2006.01)
H01G 11/26 (2013.01)
H01G 11/34 (2013.01)
H02J 7/34 (2006.01)

(56) References Cited

U.S. PATENT DOCUMENTS

| | | | |
|---|---|---|---|
| 7,625,839 B2 | 12/2009 | Hirahara et al. | |
| 7,964,173 B2 | 6/2011 | Oyama et al. | |
| 8,142,930 B2 | 3/2012 | Kojima et al. | |
| 8,318,356 B2 | 11/2012 | Gadkaree et al. | |
| 8,524,632 B2 | 9/2013 | Gadkaree et al. | |
| 8,541,338 B2 | 9/2013 | Gadkaree et al. | |
| 8,652,995 B2 | 2/2014 | Gadkaree et al. | |
| 8,784,764 B2 | 7/2014 | Gadkaree et al. | |
| 9,108,852 B1 | 8/2015 | Gadkaree et al. | |
| 2008/0165471 A1 | 7/2008 | Kojima et al. | |
| 2009/0214949 A1 | 8/2009 | Ugawa | |
| 2010/0296226 A1* | 11/2010 | Nanba | B82Y 30/00 361/502 |
| 2010/0298522 A1* | 11/2010 | Suzuki | C01B 31/02 528/230 |
| 2011/0002086 A1* | 1/2011 | Feaver | C01B 31/00 361/502 |
| 2011/0182000 A1 | 7/2011 | Gadkaree et al. | |
| 2011/0261501 A1 | 10/2011 | Gadkaree et al. | |
| 2012/0134075 A1 | 5/2012 | Kawai | |
| 2013/0148265 A1 | 6/2013 | Okuno et al. | |
| 2013/0155577 A1 | 6/2013 | Yang et al. | |
| 2013/0194721 A1 | 8/2013 | Cho et al. | |
| 2013/0201606 A1 | 8/2013 | Nansaka et al. | |
| 2013/0202945 A1 | 8/2013 | Zhamu et al. | |
| 2013/0209348 A1 | 8/2013 | Ludvik et al. | |
| 2014/0079994 A1 | 3/2014 | Affinito et al. | |
| 2014/0101992 A1 | 4/2014 | Mennell et al. | |
| 2014/0134438 A1 | 5/2014 | Gadkaree et al. | |
| 2014/0146440 A1 | 5/2014 | Gadkaree et al. | |
| 2014/0177136 A1 | 6/2014 | Kim et al. | |
| 2014/0208404 A1 | 7/2014 | Brouwer et al. | |
| 2014/0293507 A1 | 10/2014 | Gadkaree et al. | |
| 2016/0087263 A1 | 3/2016 | Gadkaree et al. | |
| 2016/0133394 A1 | 5/2016 | Sakshaug et al. | |
| 2016/0225539 A1* | 8/2016 | Gadkaree | H01G 11/86 |

FOREIGN PATENT DOCUMENTS

| | | |
|---|---|---|
| EP | 2958122 | 12/2015 |
| JP | 2004266239 A | 9/2004 |
| JP | 2005302300 | 10/2005 |
| JP | 2006086148 A | 3/2006 |
| JP | 2008289820 A | 12/2008 |
| JP | 2010118216 A | 5/2010 |

OTHER PUBLICATIONS

Liu et al., Particles and Polymer Binder Interaction: A Controlling Factor in Lithium-Ion Electrode Performance, Journal of the Electrochemical Society, 159(3), A214-A221 (2012).

Yoo et al., Interaction of Poly(vinylidene fluoride) with Graphite Particles. 1. Surface Morphology of a Composite Film and Its Relation to Prtocessing Parameters, Chem. Mater., 15, 850-861 (2003).

Yoo et al., Interaction of Poly(vinylidene fluoride) with Graphite Particles. 2. Effect of Solvent Evaporation Kinetics and Chemical Properties of PVDF on the Surface Morphology of a Composite Film and Its Relation to Electrochemical Performance, Chem. Mater., 16, 1945-1953 (2004).

International Search Report and Written Opinion PCT/US2013/015244 dated Jun. 2, 2016.

International Search Report and Written Opinion PCT/US2016/015033 dated May 10, 2016.

International Search Report and Written Opinion PCT/US2016/015041 dated Jun. 13, 2016.

International Search Report and Written Opinion PCT/US2016/015245 dated May 12, 2016.

Shu et al. J. Electrochem. Soc., vol. 140, No. 4, 922-927, Apr. 1993.

International Search Report and Written Opinion PCT/US2016/015273 dated Apr. 15, 2016.

International Search Report and Written Opinion PCT/US2015/061796 dated Apr. 13, 2016.

Lastoskie et al. "Pore Size Distribution Analysis of Microporous Carbons: A Density Function Theory Approach", J. Phys. Chem. 1993, 97, 4786-4796.

* cited by examiner

PHENOLIC RESIN SOURCED CARBON ANODE IN A LITHIUM ION CAPACITOR

CROSS-REFERENCE TO RELATED APPLICATIONS

The present application is related commonly owned and assigned USSN Application Nos., filed concurrently herewith:

Ser. No. 14/610,752, now U.S. Pat. No. 9,672,992, entitled "COKE SOURCED ANODE FOR LITHIUM ION CAPACITOR";

Ser. No. 14/610,782, now U.S. Pat. No. 9,552,930, entitled "ANODE FOR LITHIUM ION CAPACITOR", and Ser. No. 15/377,395, entitled "METHOD OF MAKING A CARBON COMPOSITION FOR AN ANODE";

Ser. No. 14/610,811, now U.S. Pat. No. 9,607,778, entitled "POLY-VINYLIDENE DIFLUORIDE ANODE IN A LITHIUM ION CAPACITOR", and Ser. No. 15/427,382, allowed May 17, 2017, entitled POLY-VINYLIDENE DIFLUORIDE ANODE BINDER IN A LITHIUM ION CAPACITOR; and Ser. No. 14/610,868, now U.S. Pat. No. 9,679,704, entitled "CATHODE FOR LITHIUM ION CAPACITOR," but does not claim priority thereto.

The entire disclosure of each publication or patent document mentioned herein is incorporated by reference.

BACKGROUND

The disclosure relates to a lithium ion capacitor (LIC), to an anode in the LIC, and to a carbon composition in the anode.

SUMMARY

In embodiments, the disclosure provides an phenolic resin sourced carbon composition for an anode in a lithium ion capacitor.

In embodiments, the disclosure provides an anode for a lithium ion capacitor having a carbon having a low surface area from 1 to 500 $m^2/g$ obtained from a phenolic resin source.

BRIEF DESCRIPTION OF THE DRAWINGS

In embodiments of the disclosure.

DETAILED DESCRIPTION

Figure 1:
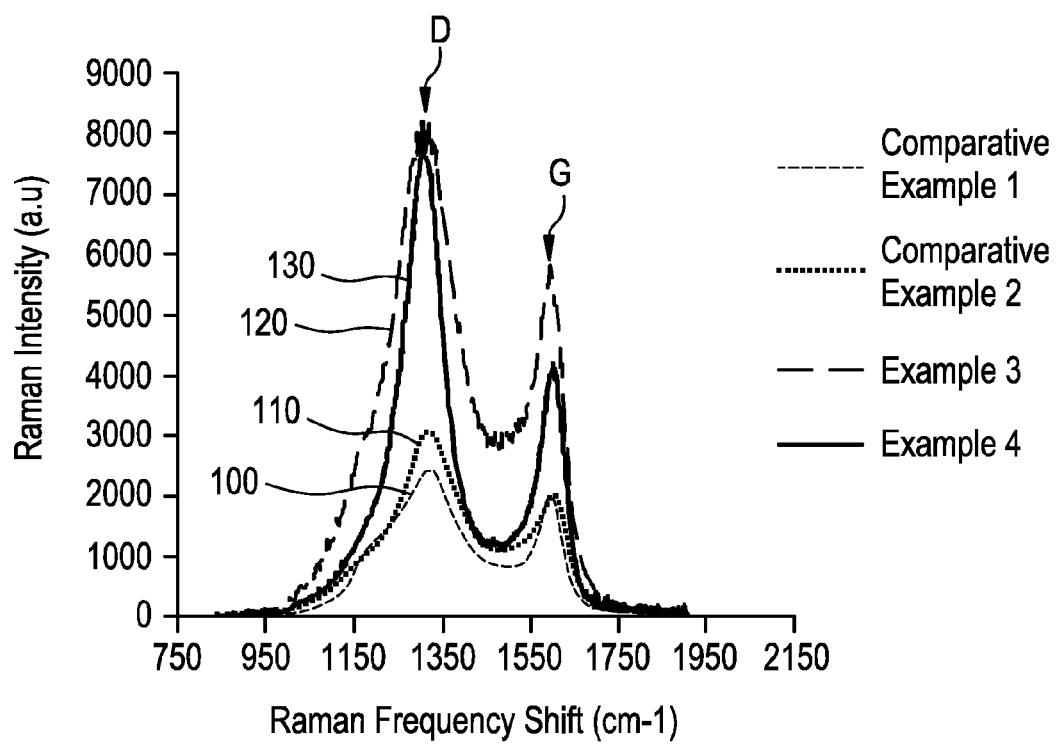
FIG. 1 shows a comparison of Raman spectroscopy frequency shifts and intensities of different carbons: carbon 1 (Comparative Example 1)(100); carbon 2 (Comparative Example 2)(110); carbon 3 (Example 1)(120); and carbon 4 (Example 2)(130).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Features or aspects recited in any of the claims are generally applicable to all facets of the invention. Any recited single or multiple feature or aspect in any one claim can be combined or permuted with any other recited feature or aspect in any other claim or claims.

Definitions

"Carbon," "carbon composition," "anode carbon," or like terms refer to an inventive phenolic resin sourced carbon material that has been heated treated in an inert atmosphere and has a surface area of from 1 to 500 $m^2/g$.

"Activated carbon," "cathode carbon," "Corning carbon," or like terms refer to a known wheat flour sourced carbon material that has been heated treated in an inert atmosphere and has a high porosity and a high surface area.

"Raman structural analysis," "Raman analysis," or like terms refer to and rely on the disorder (D) peak, the graphitic (G) peak, and a consideration of the peak intensity ratio $I_D/I_G$. The D peak intensity ($I_D$) relates to the extent of disorder in the carbon whereas the G peak intensity ($I_G$) relates to the extent of highly oriented graphitic planes. The peak intensity ratio of $I_D/I_G$ gives a quantification of the carbon structure. The higher the peak ratio of $I_D/I_G$ the greater the disorder in the carbon.

"Anode," "anode electrode," "negative electrode," or like terms refers to an electrode through which positive electric charge flows into a polarized electrical device and electrons flow out of the electrode to an outside circuit.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only;

they do not exclude other defined values or other values within defined ranges. The composition and methods of the disclosure can include any value or any combination of the values, specific values, more specific values, and preferred values described herein, including explicit or implicit intermediate values and ranges.

Lithium ion capacitors (LICs) are a new class of innovative hybrid energy storage devices. Unlike EDLC's, which store energy based on double layer mechanism on both electrodes, the hybrid lithium ion capacitors store energy on the cathode via the double layer mechanism whereas energy storage on the anode is via Faradaic mechanism. As a result, the energy density in such devices can be, for example, five times greater than an EDLC, while maintaining the power also at a 3 to 4 times greater than an EDLC's power. Despite the Faradaic mechanism of energy storage, these LIC devices still show very high cycle life, for example, in excess of 200,000 cycles, making the devices attractive for many applications. LICs utilize a high surface area (typically greater than 1,000 $m^2/g$) carbon on the positive electrode (i.e., the cathode) and an intercalating carbon with low porosity and low surface area (typically less than 300 $m^2/g$) on the negative electrode (i.e., the anode), which combination of a high and a low surface area carbon supports fast intercalation and de-intercalation of lithium ions. During charge and discharge, lithium intercalation and de-intercalation occurs within the bulk of the anode, whereas anion adsorption and desorption takes place on the cathode. The adsorption and desorption on the positive electrode is a non-Faradaic reaction, which is relatively faster than the lithium ion intercalation and de-intercalation on the negative electrode.

In the lithium ion capacitor, the negative electrode (intercalating and de-intercalating) can be pre-doped with lithium metal. The pre-doping of the lithium ion capacitor allows an increase in the voltage to approximately about 3.8 volts.

A lithium ion capacitor permits a voltage of about 1.5 times greater than that of an EDLC. The cell capacitance (C=Q/V) can be stated by the charge-discharge curve. Since the energy density and power are both proportional to square of the voltage there is a significant increase in energy and power density of the device. In addition to the voltage related increase, the Faradaic reaction also has significantly greater energy associated with it and contributes to an increase in the energy and the power density. The negative electrode stays at a constant or even potential during the charging and discharging of the cell.

Properties of the anode are significant to the performance of the device. These properties are derived mainly from the materials comprising the anode, such as the carbon material. The properties required for the Li ion capacitor anode are different from properties required for Li ion battery anodes, although both involve insertion of lithium ions in the carbon structure. The Li ion capacitor is a power device and hence a fast intercalation—deintercalation of ions is essential, whereas for Li ion batteries a slow intercalation rate is acceptable. In embodiment, the disclosure provides a carbon for the use in an anode of a lithium ion capacitor. The data provided was obtained at desired high charge-discharge rates.

In a lithium ion battery the cathode electrochemical processes are rate controlling whereas in a lithium ion capacitor the anode electrochemical processes are rate controlling. The anode side essentially controls the significant properties such as charge and discharge capacities, which directly affects the energy and power performance of a lithium ion capacitor. Different types of carbons have been evaluated as anode materials in lithium ion capacitors. Graphite has been a material of choice, but hard carbon materials, i.e., non-graphitic materials having low surface area are also being evaluated. Hard carbon materials show higher discharge capacities than graphite due to structural differences.

The fundamental function and operation of a lithium ion capacitor is different than a lithium ion battery. In a lithium ion battery, the anode comprises a lithium intercalating carbon such as graphite, mesocarbon microbeads (MCMB), hard carbon or soft carbon, and the cathode comprises of materials made from lithium complexed with transition metals. Some prominent cathode material used in the lithium ion battery industry are, for example, $LiCoO_2$, $LiMn_{1.5}Ni_{0.5}O_4$, $LiMn_2O_4$, and $LiFePO_4$.

A carbonaceous material when used on the anode electrode in a lithium ion capacitor can intercalate and de-intercalate lithium ions. Charge and discharge capacity is a quantitative measure of the carbon materials ability to store or discharge charge. Discharge capacity is an intrinsic property of a carbon material. The discharge capacity of the carbon material depends on the structure of the carbon and the impurity levels present in the carbon material. The discharge capacities can directly reflect on the significant performance aspects of a cell. A higher discharge capacity is a desirable property in a carbon on the anode side as the carbon will directly and beneficially affect the packaging volume of a cell, which in turn will beneficially affect the energy and power density in a lithium ion capacitor device. Notably, the capacity must be measured at high rates since a capacitor is a power device, unlike an energy device such as a battery, where the rates are significantly lower. The capacity of a material at high rates will be different than at low rates, and will be a function of material structure which controls the diffusion rate of lithium ion into the structure of the material.

In a lithium ion battery during the charge process, lithium ions are de-intercalated from the bulk of the cathode and transferred to the anode via an ionic conduction mechanism through the electrolyte and intercalated in to the bulk of the anode. During the charge process, the electrons flow from the cathode to the anode. During the discharging process, the entire charge process is reversed. The lithium ions are de-intercalated from the bulk of the anode and transferred to the cathode via ionic conduction mechanism through the electrolyte. The transferred lithium ions are then intercalated in to the bulk of the cathode. In a lithium ion battery, energy is stored due to faradaic reactions on the anode and the cathode electrode. The state of charge of the electrolyte is always neutral and constant which means there is no significant change in the concentration of electrolyte. The lithium ions responsible for the energy storage in a lithium ion battery completely depend on the number of lithium ions available in the cathode. However, in a lithium ion capacitor as mentioned earlier, the anode is pre-doped with lithium metal initially, which assists in increasing the operating voltage window. Lithium intercalation and de-intercalation occurs within the bulk of the anode electrode, whereas, anion adsorption and desorption takes place on the cathode. The adsorption and desorption on the cathode is a non-faradaic reaction, which is faster than the lithium ion intercalation and de-intercalation on the anode. In a lithium ion capacitor, the concentration of the electrolyte changes depending on the state of the charge of the device as the electrolyte ions are responsible for storage of energy in the respective electrodes.

In embodiments, the present disclosure provides two different carbons that can be used individually or in combination in the anode electrode of a lithium ion capacitor. The experimental results demonstrate the disclosed lithium ion capacitor can provide the desired high charge-discharge rates.

In embodiments, the disclosed phenolic resin sourced carbon composition, anodes thereof, lithium ion capacitors thereof, and method of making and using the capacitors provide one or more advantageous features or aspects, including for example as discussed below.

In embodiments, the disclosure provides an anode in a lithium ion capacitor, comprising:
a carbon composition comprising: a phenolic resin sourced carbon in from 85 to 95 wt %; a conductive carbon in from 1 to 8 wt %; and a binder in from 3 to 10 wt %; and an electrically conductive substrate that supports the carbon composition, for example, a copper or aluminum foil or sheet, wherein the phenolic resin sourced carbon has a disorder (D) peak to graphitic (G) peak intensity ratio by Raman analysis of from 1.40 to 1.9; a hydrogen content of from 0.05 to 0.5 wt %; a nitrogen content of from 0.05 to 0.5 wt %; an and oxygen content of from 0.05 to 1.75 wt %.

In embodiments, in the anode electrode: the phenolic resin sourced carbon can be present, for example, in from 88 to 92 wt %; the conductive carbon can be present, for example, in from 4 to 7 wt %; and the binder is PVDF can be present, for example, in from 4 to 6 wt % and has a molecular weight of 300,000 to 1,000,000.

In embodiments, the phenolic resin sourced carbon can have a disorder (D) peak to graphitic (G) peak intensity ratio, for example, of from 1.55 to 1.95 by Raman analysis.

In embodiments, the anode can further comprise, for example, a lithium composite powder coated on at least a portion of the surface of the anode.

In embodiments, the phenolic resin sourced carbon can have, for example, a hydrogen content of from 0.05 to 0.25 wt %; a nitrogen content of from 0.05 to 0.5 wt %; and an oxygen content of from 0.05 to 0.5 wt %.

In embodiments, the phenolic resin sourced carbon has a low surface area of from 1 to 500 m$^2$/g, and a particle size from 1 to 30 microns.

In embodiments, the disclosure provides a lithium ion capacitor, comprising:
the abovementioned anode comprising a carbon composition comprising: a phenolic resin sourced carbon in from 85 to 95 wt %; a conductive carbon in from 1 to 8 wt %; and a binder in from 3 to 10 wt %; and an electrically conductive substrate that supports the carbon composition, for example, a copper or aluminum foil or sheet, wherein the phenolic resin sourced carbon has a disorder (D) peak to graphitic (G) peak intensity ratio by Raman analysis of from 1.40 to 1.9; a hydrogen content of from 0.05 to 0.5 wt %; a nitrogen content of from 0.05 to 0.5 wt %; an and oxygen content of from 0.05 to 1.75 wt %.

In embodiments, the lithium ion capacitor of claim 7 wherein the anode operates at a high charge-discharge rate of from 1 C to 4000 C.

In embodiments, the lithium ion capacitor can further comprise, for example, a cell comprising a stack of:
the abovementioned anode;
a cathode comprising a heat and KOH activated wheat flour sourced carbon, a fluoropolymer, and a conductive carbon black;
a separator; and
a lithium composite powder coated on at least a portion of the surface of the anode.

In embodiments, the cell can have, for example, a discharge capacity of from 50 to 120 mAh/gm, for example, 55.987 for the phenolic resin sourced carbon heat treated at 1000° C., and 95.56 mAh/gm for phenolic resin sourced carbon heat treated at 1600° C., based on the anode carbon weight) and a maximum energy density of from 35 to 60 Wh/l, for example, 42.57 Wh/l for the phenolic resin sourced carbon heat treated at 1000° C., and 41.588 Wh/l for phenolic resin sourced carbon heat treated at 1600° C.

In embodiments, the disclosure provides a method of making a carbon electrode comprising:
a first heat treating of phenolic resin sourced carbon particles at from 950 to 1150° C. in an inert atmosphere;
treating the heat treated particles with an acid, and then a base;
a second heat treating of phenolic resin sourced carbon particles at from 950 to 1700° C. in an inert atmosphere;
mixing the second heat treated particles with a binder, and a solvent to form a mixture; and
applying the mixture on a conductive current collector to form the electrode.

In embodiments, the method of making can further comprising, for example, including a conductive carbon in an amount of from 1 to 8 wt % in the mixture.

The present disclosure is advantaged is several aspects, including for example:

The disclosed phenolic resin sourced carbon anodes demonstrated superior high charge—discharge rates, for example, over the comparative phenolic resin sourced carbon and the graphite carbon.

The disclosed phenolic resin sourced carbon anodes demonstrated superiority in energy and power density performance over the comparative phenolic resin sourced carbon and the graphite carbon.

In embodiments, the present disclosure has identified a first phenolic resin sourced carbon that was carbonized at 1000° C. (i.e., carbon 3), and a second carbon that was carbonized at 1600° C. (i.e. carbon 4) having superior rate and capacitance performance in LIC devices. The materials, method of making and using, and the LIC device performance are disclosed below and compared with prior art materials.

In embodiments, the disclosure provides two different carbons for LIC anode components, i.e., a first carbon comprising a phenolic resin sourced or phenolic resin sourced carbon, having a surface area of from 1 to 500 m$^2$/gm, that was carbonized at 1000° C., treated with HCl, and re-treated at 1000° C. (i.e., carbon 3), and a second carbon comprising a phenolic resin sourced having a surface area of from 1 to 500 m$^2$/gm that was been carbonized at 1600° C. (i.e., carbon 4). Both the first and second carbon compositions show superior performance in rate and energy compared to prior art materials as demonstrated further below.

Discharge capacity is an intrinsic property of a carbon material. Although not bound by theory, the discharge capacity of the carbon material depends on the structure of the carbon and the impurity levels present in the carbon material as shown below based on the Raman structural analysis and elemental chemical analysis. The greater the discharge capacity, the greater the energy density of the device.

Both carbon 3 and carbon 4, obtained from synthetic sources, provide superior performance compared to the prior art materials. This superior performance leads to LIC devices having greater energy and greater power characteristics. Improved energy performance of the device is a significant commercial advantage.

In embodiments, the disclosure provides a phenolic resin sourced carbon composition (carbon 3), that was obtained by curing to the phenolic resin at 150° C. in air followed by a first heating or carbonization at 1000° C., washing with aqueous HCl to remove metallic impurities, followed by a second heating or carbonization at 1000° C. for about 1 to 10 hours. In embodiments, the disclosure provides a phenolic resin sourced carbon composition (carbon 4), that was obtained by curing to the phenolic resin at 150° C. in air followed by a first heating or carbonization at 1000° C., washing with aqueous HCl to remove metallic impurities, followed by a second heating or carbonization at 1600° C. for about 1 to 10 hrs.

The performance comparison of anodes containing either carbon 3 or carbon 4 with certain prior art carbons produced from different raw or source materials such as a phenolic resin carbonized at 660° C., and a graphite.

Figure 2:
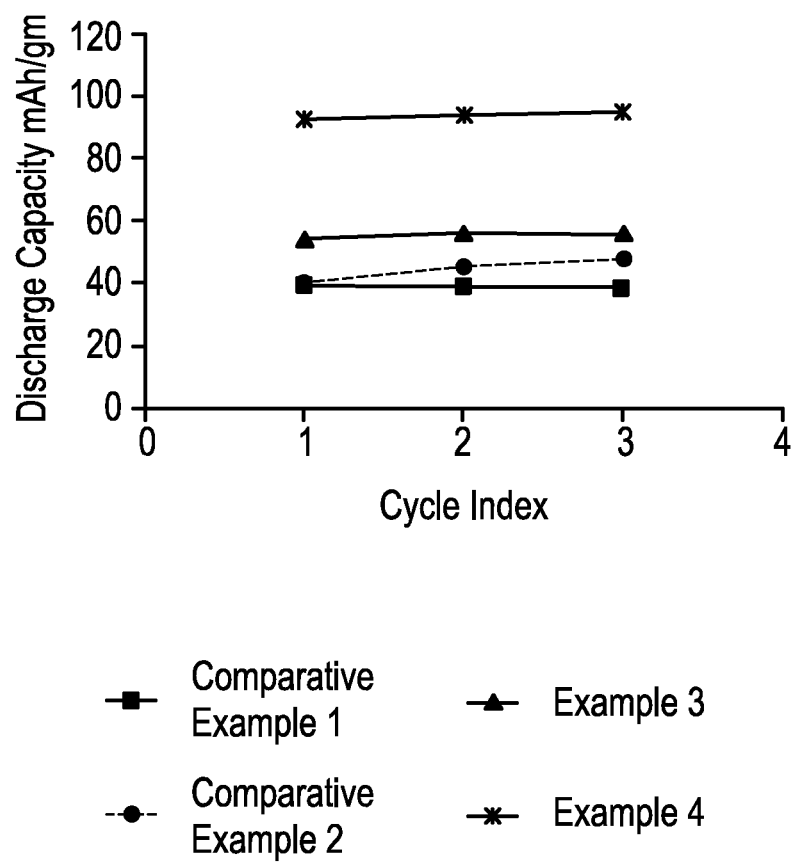
FIG. 2 shows discharge capacities for conditioning cycles for carbons 1 to 4 based on different source materials or different processing.

It is generally recognized that a carbonaceous material used on the anode in a lithium ion capacitor can intercalate and de-intercalate lithium ions. Charge and discharge capacity is a quantitative measure of the carbon's ability to store or discharge charge. Discharge capacity is an intrinsic property of a carbon material which depends on the structure of the carbon and the impurity levels present. A greater discharge capacity increases the energy density proportionally. FIG. 2 shows the discharge capacities (normalized on the anode carbon weight, measured at C/2 rate) during the conditioning cycles for carbon 3 and carbon 4, and prior art materials including a phenolic resin carbon carbonized at 660° C. (carbon 1) and a graphite (carbon 2). The discharge capacities for carbons 1, 2, 3, and 4 were 39.37 mAh/gm, 48.46 mAh/gm, 55.98 mAh/gm, and 95.565 mAh/gm respectively. The discharge capacities are normalized based on the anode carbon weight.

In embodiments, the disclosure provides a method of using the disclosed capacitor, comprising:

discharging the capacitor to provide a useful power density.

In embodiments, the method can further comprise, for example, discharging the capacitor in combination with at least one of: a vehicle, an electronic appliance, a consumer electronic device, a component of an electrical grid system, or a combination thereof. The capacitor can be used in combination with another system having a need for storage, supply, or both, of power, for example, at least one of: a vehicle, a consumer electronic device, an electronic appliance, a component of an electrical or power grid system, or a combination thereof. A vehicle can be, for example, a mobile machine that transports, for example, people, cargo, or a purposeful payload, such as camera or an military ordinance in a drone or unmanned aerial system (UAS). Other examples of vehicles are wagons, bicycles, motor vehicles (e.g., motorcycles, cars, trucks, buses, trains), watercraft (e.g., ships, boats), spacecraft, aircraft, or combinations thereof.

Figure 3:
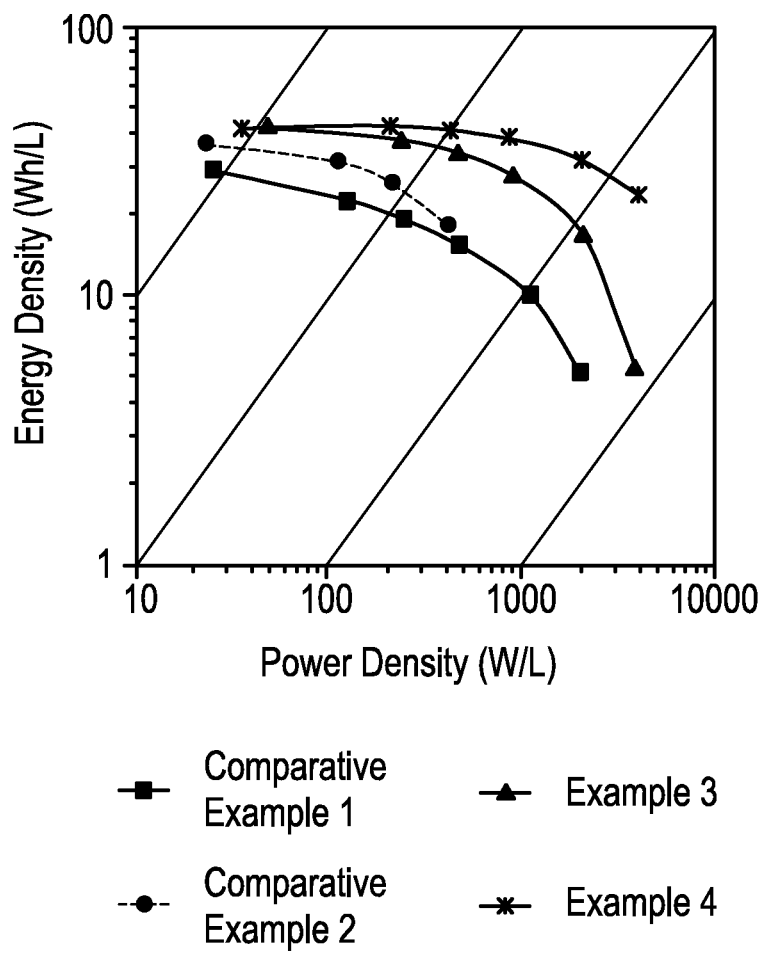
FIG. 3 shows a Volumetric Ragone plot comparing the rate performances of carbons 1 to 4 from different source materials or different processing.

FIG. 3 shows the rate performance comparison for devices containing the four carbons mentioned above. Both carbon 3 and carbon 4 individually showed superior energy and power density performance when compared to carbon 1 or carbon 2. Superior high rate performance is significant for a capacitor device because the device is subjected to high rate charge—discharge cycles unlike batteries where the charge discharge rates are orders of magnitude lower. At 1 C rate LIC devices containing one of the four carbons, respective, in anodes gave the following performance:

Comparative carbon 1 had an energy density of 29.44 Wh/l and power density of 24.88 W/l;

Comparative carbon 2 (a graphite) had an energy density of 36.67 Wh/l and power density of 26.27 W/l;

carbon 3 had an energy density of 42.57 Wh/l and a power density of 47.51 W/l; and carbon 4 had an energy density of 41.588 Wh/l and power density of 34.631 W/l.

Carbon 3 and carbon 4 showed considerable advantage and superiority in energy and power density performance over the carbon 1 and carbon 2. As the Ragone data shows LIC devices containing carbon 3 or carbon 4 sourced anodes outperformed devices containing carbon 1 or carbon 2 sourced anodes over the entire range of rate testing in both power and energy density.

EXAMPLES

The following Examples demonstrate making, use, and analysis of the disclosed phenolic resin sourced carbon and methods in accordance with the above general procedures.

Comparative Example 1

Carbon 1: Phenolic resin sourced carbon carbonized at 660° C. (mentioned in US 2013/0201606A1) A phenolic resin, GP® 510D50 RESI-SET® phenolic impregnating resin (from Georgia Pacific) was cured at from 100 to 125° C. A phenolic resin plate was also prepared by curing the phenolic resin at 100 to 120° C. and then ground to a fine powder. The powdered resin was then placed in a retort furnace and heated at 50° C./hr to 500° C. The furnace temperature was then held at 500° C. for 1 hr. The furnace was then ramped at 10° C./hr to 660° C. The furnace was then held at 660° C. for 1 hr. The furnace was switched off and passively cooled. The resulting carbon 1 was ground to a 5 micron particle size and subjected to Raman spectroscopy for structure analysis. The stacked Raman spectra are shown in FIG. 1. The carbon 1 had an $I_D$ peak (disorder peak) at 1308.83 $cm^{-1}$ with an intensity of 2339.745 a.u., and an $I_G$ peak at approximately 1601.01 $cm^{-1}$ with an intensity of 1952.962 a.u. (Table 1). The peak ratio of $I_D/I_G$ for carbon 1 was 1.20. The carbon 1 (phenolic resin sourced carbon) was also subjected to relative percentage elemental analysis. The samples were dried under vacuum at 125° C. for 6 hrs prior to the analysis. All the elemental results are reported on a dried basis and are summarized in Table 2. The elemental analysis of phenolic resin sourced carbon treated at 660° C. found: C: 95.27%, H: 1.76%, N: 0.1%, and O: 2.11%. The carbon 1 was also subjected to BET analysis to probe the surface area of the carbon, which was 426.8621 $m^2/gm$.

The resulting carbon was used to cast anode electrodes for a lithium ion capacitor. The anode consisted of 90 wt % of the phenolic resin sourced carbon 1, 5 wt % Timcal Super C-45 conductive carbon, and 5 wt % of KYNAR HSV 900 grade PVDF (molecular weight: 1,000,000) as a binder.

The anode was prepared as follows. 3.6 grams of the phenolic resin sourced carbon and 0.2 grams of Timcal Super C-45 were balled milled in a Retsch PM-100 ball mill for 15 mins at 350 rpm. 0.2 gram of PVDF was added to the mixture and ball-milled for 15 mins at 350 rpm. Several drops of N-methyl pyrrolidinone (NMP) were added to the mixture to form a paste of the mixture. The paste was then coated on a copper foil (Product number-Oak Mitsui TLB-DS), and passed through a rolling mill to produce a 4 mil thickness of the mixture. The calendared electrode was punched to make 14 mm diameter circular electrodes. The punched electrodes were the dried 16 hrs at 120° C. under vacuum.

The cathode consisted of 85% of the activated Corning carbon (cathode carbon) mentioned below, 10 wt % PTFE (DuPont 601A Teflon PTFE), and 5 wt % Cabot Black Pearl 2000 (see for example, U.S. Pat. Nos. 8,318,356, 8,784,764, 8,524,632, and 8,541,338).

A Li ion capacitor was built in a CR2032 format cell by stacking in an aluminum clad coin cell, in the order of:

the cathode electrode made from 85 wt % of the Corning carbon mentioned below, and 5 wt % Cabot Black Pearl 2000;

an NKK-4425 separator; and 5 mg of lithium composite powder (LCP) is coated on the anode made of carbon 1 (phenolic resin sourced carbon carbonized at 660° C.).

The lithium composite powder (LCP) is an encapsulated lithium particle comprising: a core comprised of at least one of: lithium; a lithium metal alloy; or a combination thereof; and a shell comprised of a lithium salt, and an oil, the shell encapsulates the core, and the particle has a diameter of from 1 to 500 microns (see commonly owned and assigned U.S. Ser. No. 13/673,019, filed Nov. 9, 2012, entitled "LITHIUM COMPOSITE PARTICLES," and U.S. Ser. No. 14/493,886, filed Sep. 23, 2014, entitled "ENCAPSULATED LITHIUM PARTICLES AND METHODS OF MAKING AND USE THEREOF"). The LCP is used for pre-doping the anode.

The Corning carbon was made from a wheat flour precursor. The wheat flour was carbonized at from 650 to 700° C. The carbonized carbon was ground to a particle size of approximately 5 microns. The ground carbonized carbon was then activated at 750° C. with KOH (alkali) in a weight ratio of 2.2:1 KOH:carbon for 2 hrs. The carbon was further washed with water to remove any remaining KOH. The resulting activated carbon was then treated with HCl to neutralize any trace of KOH and then washed with water to neutralize the carbon to a pH of 7. The activated carbon was then heat-treated under nitrogen and hydrogen forming gas at 900° C. for 2 hrs.

The cell was then crimped on a MTI coin cell crimper and conditioned on an Arbin BT 2000 at a constant current charge/discharge at 0.5 mA current from 3.8V to 2.2V. Carbon 1 had a discharge capacity of 39.374 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of carbon 1 on a volume basis. The cell had a maximum energy density of 29.44 Wh/l.

Comparative Example 2

Carbon 2. Graphite Sourced Carbon and Electrode Performance

A Timcal TB-17 graphite powder specially synthesized for Li ion electrode applications was acquired from MTI Corp., and used as received. The received carbon was subjected to Raman spectroscopy for structure analysis. The stacked Raman spectra are shown in FIG. 1. The graphite had an $I_D$ peak (disorder peak) at 1316.33 cm$^{-1}$ with an intensity of 3019.06 a.u., and an $I_G$ peak at approximately 1599.91 cm$^{-1}$ with an intensity of 2000.583 a.u. (Table 1). The peak ratio of $I_D/I_G$ was 1.51. The Timcal graphite powder was subjected to elemental analysis as in Comparative Example 1; found: C: 99.4%; H: 0.27%; N: 0.02%; and O: less than 0.1%.

The graphite was used in casting anode electrodes for a lithium ion capacitor. The anode consisted of 90 wt % Timcal graphite powder, 5 wt % Timcal Super C-45 conductive carbon from MTI Corp., and 5 wt % of KYNAR HSV 900 grade PVDF (molecular weight: 1,000,000) as a binder.

The anode was made as follows. 3.6 grams of the Timcal graphite powder carbon and 0.2 grams of the Timcal Super C-45 were balled milled in a Retsch PM-100 ball mill for 15 mins at 350 rpm. 0.2 grams of PVDF was added to the Timcal graphite powder and Timcal Super C-45 mixture and was ball-milled for 15 mins at 350 rpm. A few drops of N-methyl pyrrolidinone (NMP) were added to the mixture to form a paste of the mixture. The paste was then coated on a copper foil (Product number—Oak Mitsui TLB-DS), and passed through a rolling mill to achieve a 4 mil carbon thickness. The calendared electrodes were punched to make 14 mm diameter circular electrodes. The punched electrodes were the dried 16 hrs at 120° C. under vacuum.

A Li ion capacitor was built in a CR2032 format cell. The cathode comprised 85% of the above mentioned Corning carbon, 10% PTFE (DuPont 601A Teflon PTFE), and 5% Cabot Black Pearl 2000. The separator was NKK-4425 separator. The 5 mg of the above mentioned lithium composite powder was coated on an anode made from the Timcal TB-17 graphite powder.

The cell was then crimped on a MTI coin cell crimper and conditioned on an Arbin BT 2000 at constant current charge/discharge at 0.5 mA current from 3.8V to 2.2V. The cell with graphite anode gave a discharge capacity of 48.46 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the Timcal TB-17 Graphite on a volume basis. The cell had a maximum energy density of 36.69 Wh/l.

Comparative Example 3

Carbon 3

Comparative example 1 was repeated with the exception that the ground resin was first heat treated (i.e., carbonized) at 1000° C. for 2 hrs under nitrogen. The carbonized resin was then washed with 1N HCl for 16 hrs followed by distilled water washes until pH 5 was achieved. The resulting carbon was then washed with 1 N NH$_4$OH followed by distilled water washes until pH 5 was achieved. The carbon was then second heat treated to 1000° C. for 2 hrs under nitrogen. The resulting carbon 3 was subjected to Raman spectroscopy for structure analysis and the stacked Raman spectra are shown in FIG. 1. Carbon 3 had an $I_D$ peak (disorder peak) at 1315.23 cm$^{-1}$ with an intensity of 8250.880 a.u., and an $I_G$ peak at approximately 1595.84 cm$^{-1}$ with an intensity of 5805.220 a.u. (Table 1). The ratio of $I_D/I_G$ was 1.42. The carbon 3 elemental analysis as in Comparative Example 1 found: C: 97.2 wt %; H: 0.39 wt %; N: 0.27 wt %; and O: 1.69 wt %.

Carbon 3 is used in casting anodes for a lithium ion capacitor and was assembled and tested as in Comparative Example 1. Carbon 3 gave a discharge capacity of 55.987 mAh/gm (based on the anode carbon weight) after the third conditioning cycle (FIG. 2). FIG. 3 shows the C-rate performance of carbon 3 on volume basis. The cell had a maximum energy density of 42.57 Wh/l.

Example 4

Carbon 4

Comparative example 1 was repeated with the exception that the ground resin was first heat treated (i.e., carbonized) at 1000° C. for 2 hrs under nitrogen. The carbon was then second heat treated to 1600° C. for 2 hrs under nitrogen. The resulting carbon 4 was subjected to Raman spectroscopy for structure analysis and the stacked Raman spectra are shown in FIG. 1. Carbon 4 had an $I_D$ peak (disorder peak) at 1308.36 $cm^{-1}$ with an intensity of 7855.690 a.u., and an $I_G$ peak at approximately 1600.65 $cm^{-1}$ with an intensity of 4232.410 a.u. (Table 1). The peak ratio of $I_D/I_G$ was 1.42. The carbon 4 elemental analysis as in Comparative Example 1 found: C: 98.54 wt %; H: 0.1 wt %; N: 0.11 wt %; and O: 0.1 wt %. Carbon 4 was used in casting anodes for a lithium ion capacitor and was assembled and tested as in Comparative Example 1. Carbon 4 gave a discharge capacity of 95.565 mAh/gm (based on the anode carbon weight) after the third conditioning cycle (FIG. 2). FIG. 3 shows the C-rate performance of carbon 4 on volume basis. The cell had a maximum energy density of 41.588 Wh/l.

TABLE 1

Comparison of Raman Intensities (I) for the Disorder ($I_D$) peak, the Graphitic peak ($I_G$) and the peak ratio ($I_D/I_G$) for different carbons.

| Carbon | $I_D$ (a.u.) | $I_G$ (a.u.) | $I_D/I_G$ |
| --- | --- | --- | --- |
| Comp. Ex. 1 (carbon 1; phenolic resin sourced) | 2339.745 | 1952.962 | 1.20 |
| Comp. Ex. 2 (carbon 2; graphite) | 3019.060 | 2000.583 | 1.51 |
| Example 3 (carbon 3; phenolic resin sourced) | 8250.880 | 5805.22 | 1.42 |
| Example 4 (carbon 4; phenolic resin sourced) | 7855.690 | 4232.410 | 1.85 |

TABLE 2

Comparison of relative elemental carbon, hydrogen, nitrogen, and oxygen weight percentages in different carbons.

| Example Number | Carbon % | Hydrogen % | Nitrogen % | Oxygen % |
| --- | --- | --- | --- | --- |
| Comp. Ex. 1 | 95.27 | 1.76 | 0.1 | 2.11 |
| Comp. Ex. 2 | 99.44 | 0.27 | 0.02 | 0.1 |
| Ex. 3 | 97.21 | 0.39 | 0.27 | 1.69 |
| Ex. 4 | 98.54 | 0.1 | 0.11 | 0.1 |

The disclosure has been described with reference to various specific embodiments and techniques. However, it should be understood that many variations and modifications are possible while remaining within the scope of the disclosure.

What is claimed is:

1. An anode in a lithium ion capacitor, comprising:
   a carbon composition comprising: a phenolic resin sourced carbon in from 85 to 95 wt %; a conductive carbon in from 1 to 8 wt %; and a binder in from 3 to 10 wt %; and
   an electrically conductive substrate that supports the carbon composition, wherein the phenolic resin sourced carbon has a disorder (D) peak to graphitic (G) peak intensity ratio by Raman analysis of from 1.55 to 1.95; a hydrogen content of from 0.05 to 0.5 wt %; a nitrogen content of from 0.05 to 0.5 wt %; and an oxygen content of from 0.05 to 1.75 wt %.

2. The anode of claim 1 wherein:
   the phenolic resin sourced carbon in from 88 to 92 wt %;
   the conductive carbon in from 4 to 7 wt %; and
   the binder is PVDF in from 4 to 6 wt % and has a molecular weight of 300,000 to 1,000,000.

3. The anode of claim 1 further comprising a lithium composite powder coated on at least a portion of the surface of the anode.

4. The anode of claim 1 wherein the phenolic resin sourced carbon has a hydrogen content of from 0.05 to 0.25 wt %; a nitrogen content of from 0.05 to 0.5 wt %; and an oxygen content of from 0.05 to 0.5 wt %.

5. The anode of claim 1 wherein the phenolic resin sourced carbon has a low surface area of from 1 to 500 $m^2$/g, and a particle size from 1 to 30 microns.

6. The anode of claim 1 wherein the anode operates at a high charge—discharge rate of from 1 C to 4000 C.

7. The anode of claim 1 further comprising:
   a cell comprising a stack of:
   the anode;
   a cathode comprising a heat and KOH activated wheat flour sourced carbon, a fluoropolymer, and a conductive carbon black;
   a separator; and
   a lithium composite powder coated on at least a portion of the surface of the anode.

8. The anode of claim 7 wherein the cell has a discharge capacity of from 50 to 120 mAh/gm and a maximum energy density of from 35 to 60 Wh/l.

9. A method of making a carbon electrode comprising:
   a first heat treating of phenolic resin sourced carbon particles at from 950 to 1150° C. in an inert atmosphere;
   treating the first heat treated particles with an acid, and then a base;
   a second heat treating of the acid and base treated phenolic resin sourced carbon particles at from 1600 to 1700° C. in an inert atmosphere;
   mixing the second heat treated particles with a binder, and a solvent, to form a mixture; and
   applying the mixture on a conductive current collector to form the electrode, wherein the carbon electrode includes a carbon composition comprising: the phenolic resin sourced carbon in from 85 to 95 wt %; the conductive carbon in from 1 to 8 wt %; and the binder in from 3 to 10 wt %; and
   an electrically conductive substrate that supports the carbon composition, wherein the phenolic resin sourced carbon has a disorder (D) peak to graphitic (G) peak intensity ratio by Raman analysis of from 1.55 to 1.95; a hydrogen content of from 0.05 to 0.5 wt %; a nitrogen content of from 0.05 to 0.5 wt %; and an oxygen content of from 0.05 to 1.75 wt %.

* * * * *

UNITED STATES PATENT AND TRADEMARK OFFICE
CERTIFICATE OF CORRECTION

PATENT NO. : 9,911,545 B2
APPLICATION NO. : 14/610848
DATED : March 6, 2018
INVENTOR(S) : Kishor Purushottam Gadkaree et al.

It is certified that error appears in the above-identified patent and that said Letters Patent is hereby corrected as shown below:

On the Title Page

Column 2, item [57], Line 7, delete "an and" and insert -- and an --, therefor.

Page 2, Column 2, item [56], Line 6, delete "Prtocessing" and insert -- Processing --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*